United States Patent [19]
Koch et al.

[11] Patent Number: 5,014,910
[45] Date of Patent: May 14, 1991

[54] PROCESS FOR OPERATING A MOTOR VEHICLE HEATING SYSTEM AND MOTOR VEHICLE HEATING SYSTEM

[75] Inventors: Peter Koch; Peter Waas, both of Munich; Franz Neumeyer, Ascholding; Georg Baechle, Germering, all of Fed. Rep. of Germany

[73] Assignee: Webasto AG Fahrzeugtechnik, Fed. Rep. of Germany

[21] Appl. No.: 448,368

[22] Filed: Dec. 11, 1989

[30] Foreign Application Priority Data

Jan. 5, 1989 [DE] Fed. Rep. of Germany ....... 3900255

[51] Int. Cl.$^5$ .............................................. B60H 1/02
[52] U.S. Cl. ............................ 237/2 A; 237/12.3 B; 237/12.3 C
[58] Field of Search ............. 237/8 C, 12.3 B, 12.3 A, 237/12.3 C, 2 A

[56] References Cited

U.S. PATENT DOCUMENTS 4,892,248  1/1990  Robin et al. .................... 237/12.3 B

FOREIGN PATENT DOCUMENTS 2657803  9/1977  Fed. Rep. of Germany ...... 237/8 C
3514198  10/1986  Fed. Rep. of Germany ...... 237/8 C Primary Examiner—Henry A. Bennett
Attorney, Agent, or Firm—Sixbey, Friedman, Leedom & Ferguson

[57] ABSTRACT

A motor vehicle heating system which is provided in a motor vehicle coolant circuit containing a motor vehicle engine, a motor vehicle heater with a heat exchanger and an associated blower, and a fuel operated heating device that is independent of the motor vehicle engine and is connected upstream from the motor vehicle heater, and a process for operating such a motor vehicle heating system, by which the motor vehicle engine in the motor vehicle coolant circuit is heated first to a temperature which is low yet facilitates its starting, and then the coolant is heated so that the motor vehicle heater can provide heat quickly. Until a first predetermined temperature of the coolant is reached, the coolant, is circulated in the complete motor vehicle coolant circuit. Then, the coolant, while bypassing the motor vehicle engine and the motor vehicle heater, is circulated between the intake and the outlet of the fuel operated heating device, until a second predetermined temperature is reached, at which point, the bypass connecting the intake and outlet of the heating device is opened. After reaching and exceeding the second predetermined temperature, the coolant is the, again, gradually circulated in a controlled manner in the complete motor vehicle coolant circuit as the bypass is gradually closed until its final closed position.

12 Claims, 2 Drawing Sheets

PROCESS FOR OPERATING A MOTOR VEHICLE HEATING SYSTEM AND MOTOR VEHICLE HEATING SYSTEM

BACKGROUND OF THE INVENTION

The invention relates to a process for operating a motor vehicle heating system in a motor vehicle coolant circuit which contains a motor vehicle engine, a motor vehicle heater with a heat exchanger and associated blower. The invention also relates to a fuel-operated heating device, especially a motor vehicle auxiliary heating device that is operable independent of the engine, and which is connected upstream from the motor vehicle heater, as well as a motor vehicle heating system with the units mentioned above.

From German Offenlegungsschrift 35 21 372, a heating system for motor vehicles is known which contains a heating device that is operated by fuel independent of the engine in a coolant circuit that has a motor vehicle heat exchanger and a motor vehicle heating blower. A temperature sensor in the heating circuit detects the temperature of the coolant and if it is lower than 50° C., for example, the speed of a circulating pump in the heating circuit is lowered by a control device to accelerate the warming of the coolant as it passes through the heating device. Depending on the temperature of the coolant in the heating circuit, the speed of the circulating pump can be raised in steps or it can be continuously adjusted in an infinitely variable manner up to the nominal speed.

In this motor vehicle heater, a particularly significant reduction of the time which elapses between the turning on of the heating device and the releasing of heat by the heat exchanger into the passenger compartment is achieved, so that heating comfort in the motor vehicle is improved. With this heater, the heating of the passenger compartment is given priority, while the preheating of the motor vehicle engine connected in the coolant circuit is possible only by the residual heat remaining downstream from the motor vehicle heat exchanger. However, a homogeneous heating of the motor vehicle engine, which is particularly effective for favorable starting performance, cannot be attained this way.

From German Offenlegungsschrift 23 51 472, a process is known for rapid preheating of a water-cooled motor vehicle engine and for rapid heating of the interior space of the motor vehicle, as is an arrangement for carrying out the process. In this case, after the fuel operated heating device is turned on, the intake and exhaust side of this device is short-circuited to bring the coolant circulating in this short circuit rapidly to a temperature greater than 60° C. After this temperature is reached, the heated coolant is then conveyed through the heat exchanger of the motor vehicle to heat up the interior space of the motor vehicle rapidly. After the heated coolant passes through the heat exchanger of the motor vehicle, the coolant goes back through the motor vehicle engine and to the fuel operated heating device.

Even in this process, the heating of the passenger compartment is given priority. As a result, with such a motor vehicle heating system, difficulties in starting the motor vehicle engine can also occur, and in addition, these difficulties in starting can depend on the size or the engine volume of the motor vehicle engine.

SUMMARY OF THE INVENTION

Therefore, a primary object of the present invention is to provide a process for operating a motor vehicle heating system and a motor vehicle heating system of the initially mentioned type which make it possible to both sufficiently preheat the motor vehicle engine for it to be reliably started, and also, obtain the quickest possible heating of the motor vehicle interior using a fuel operated heating device that is independent of the engine, while overcoming the difficulties described above.

According to the invention, a process for operating a motor vehicle heating system in a motor vehicle coolant circuit, which contains a motor vehicle engine, a motor vehicle heater with a heat exchanger and an associated blower, and a heating device, particularly an auxiliary fuel operated heating device that is operable independent of the motor vehicle engine and is connected upstream from the motor vehicle heater is provided which, for this purpose, circulates the engine coolant through the complete motor vehicle coolant circuit until a first predetermined temperature of up to about 30° C. is reached. When the first predetermined temperature is reached or exceeded, the coolant is caused to bypass the motor vehicle engine and the motor vehicle heater, and circulates in a loop between the intake and the outlet of the fuel operated heating device until a second predetermined temperature of 70° to 80° C. is reached or exceeded. Then, when the second predetermined temperature is reached, the coolant is gradually circulated, again, in a controlled way, in the complete motor vehicle coolant circuit.

A motor vehicle heating system in a motor vehicle coolant circuit, which contains a motor vehicle engine, a motor vehicle heater, a heat exchanger with an associated blower, and a fuel operated heating device, in particular a fuel operated auxiliary heating device, connected upstream from the motor vehicle heater, is provided, in accordance with the present invention, with a bypass line interconnecting the intake and the outlet of the fuel operated heating device. A thermostat controls flow through the bypass line in a manner such that it is completely closed up to a first predetermined coolant temperature of up to about 30° C. When the first predetermined temperature is reached or surpassed, the thermostat completely opens the bypass line, which remains completely open, until a second predetermined temperature of about 70° C. to 80° C. is reached, at which time the bypass line is gradually closed, in a controlled manner, until it is completely closed.

In the process for operating a motor vehicle heating system as well as with the motor vehicle heating system itself, according to the invention, after the fuel operated heating device is turned on, at first, coolant flows through the entire coolant circuit to sufficiently heat up the motor vehicle engine for it to be started without difficulty. Then, the bypass line connecting the intake with the outlet of the fuel operated heating device is completely opened. Thus, the amount circulating in the motor vehicle coolant circuit decreases to a low value, so that a very large amount of coolant goes through the bypass to heat it rapidly to a temperature of about 70° C. Thanks to the large amount of coolant flowing through the heating device, difficulties in operating it because of heat build-up in the device and the like, can be avoided. If this temperature of about 70° C. is reached, with the coolant temperature rising, the bypass is gradually closed in a controlled manner, so that the amount of coolant flowing through the entire coolant circuit gradually rises. This gradual closing of the bypass is performed so that, for example, in the fuel operated heating device a temperature between about 70° C. and 80° C. is maintained constant. If a temperature of about 80° C. is exceeded, the bypass is completely closed so that it can then be controlled depending on the heat requirements.

To avoid the motor vehicle engine in the motor vehicle coolant circuit experiencing starting problems, particularly under cold starting conditions, the invention, at first, causes the entire coolant circuit to be heated to a relatively low coolant temperature. For this slight heating, only a relatively short time is needed, and then, as a priority, a rapid heating of the coolant is accomplished since the coolant flow bypasses the motor vehicle heater and the motor vehicle engine and a large amount of coolant flows through the fuel operated heating device. Then, after the second predetermined temperature is reached, the passenger compartment is supplied with heat by the motor vehicle heat exchanger and the blower associated to it.

Advantageously, the heating system according to the invention is designed so that the bypass line is built into the fuel operated heating device, itself, along with the thermostat that is assigned to it. In this way, the installation of the fuel operated heating device is simplified, since no additional lines have to be laid when it is installed, so that the fuel operated heating device can be easily integrated, in the in-line assembly, into the coolant circuit.

For the temperature-dependent control of the opening and closing of the bypass line, several alternatives are possible in accordance with the invention. For one thing, a solenoid valve can be placed in the bypass line which is controlled by the control device of the fuel operated heating device which uses the temperature sensor built into the fuel operated heating device for thermodynamic control.

On the other hand, at least one valve can be placed in the bypass line that can be controlled by an element made of a material that expands with increases in temperature. This valve can also be designed as a double-action valve. Alternatively, an element made of thermally expandable material can be placed at each end of the bypass line leading to the intake and outlet of the heating device to control the flow through the bypass line. In this case, the opening and closing of the bypass line are independent of the control or the control device of the fuel operated heating device.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
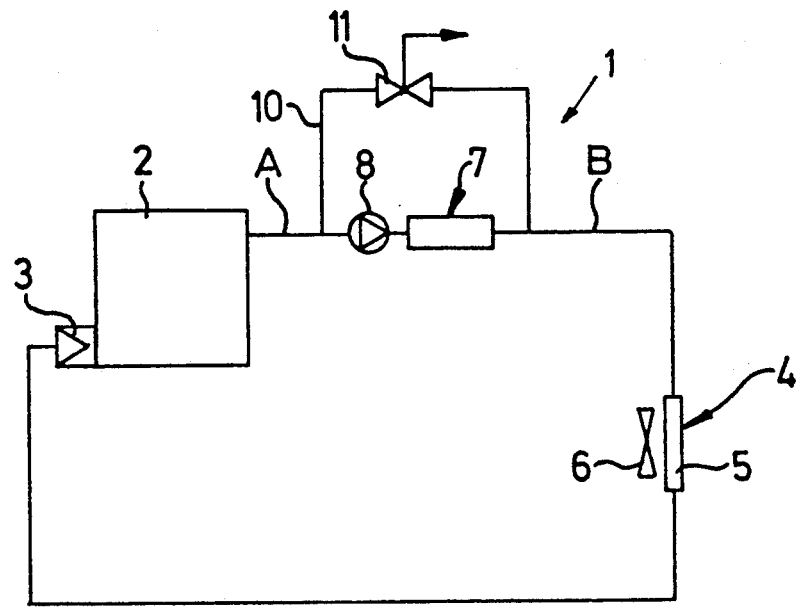
FIG. 1 is a diagrammatic view of a motor vehicle heating system for performing the operating process according to the invention.

In FIG. 1, a motor vehicle heating system as a whole is designated 1. Motor vehicle heating system 1 is provided in a motor vehicle coolant circuit which contains a motor vehicle engine 2 with circulating pump 3 on an intake side of the engine, a motor vehicle heater 4, which comprises a heat exchanger 5 built into the motor vehicle heater and a blower or heat ventilator 6 associated with it, and a fuel operated heating device 7 that is an auxiliary heater that is able to function independent of the engine and which has a circulating pump 8. Motor vehicle heating system 1, as described thus far, has the usual type of construction. The section of the motor vehicle coolant circuit coming from motor vehicle engine 2 is designated A in FIG. 1, and the section coming from fuel operated heating device 7 is designated B.

Figure 3:
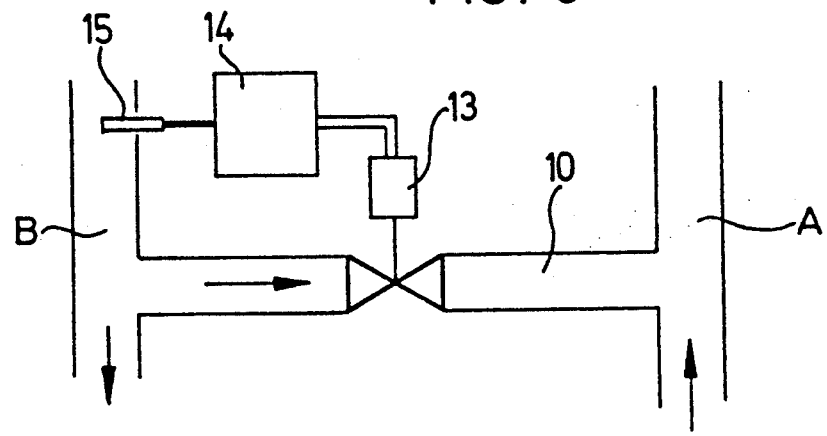
FIGS. 3-5 are diagrammatic views depicting three embodiments of valve arrangements by which opening and closing of a bypass line is achievable in accordance with the invention, FIG. 3 showing use of a solenoid valve, and FIGS. 4,5 showing valves that are operated by elements made of extensible material.

A bypass line 10 is shown in the motor vehicle heating system 1 which, according to the invention, connects section B directly with section A. A control valve 11 is placed in the bypass line 10 and operates in dependence upon temperatures sensed via, for example, a temperature sensor. To control valve 11, a temperature sensor can be used which, for example, is formed by the temperature sensor built into the fuel operated auxiliary heating device 7. Alternatively, a temperature sensor can be placed in the section A upstream from circulating pump 8, or a temperature sensor can be placed in the area of section B, i.e., at the outlet side of the fuel operated heating device 7 as shown in FIG. 3.

Below, the process for operating this motor vehicle heating system 1 is explained.

When the fuel operated heating device is initially turned on, the bypass line 10 is held completely closed by control valve 11, until, with the aid of the temperature sensor, a first predetermined temperature of the coolant of up to about 30° C., preferably between 20° and 30° C., is reached. This first predetermined temperature is dependent on the type and the size of motor vehicle engine 2 in motor vehicle heating system 1. This first predetermined temperature value can be determined empirically and, optionally, can be matched to the respective motor vehicle engine 2. Until this first predetermined temperature is reached the coolant circulates in the complete motor vehicle coolant circuit, i.e., the coolant flows through motor vehicle engine 2, fuel operated heating device 7, and motor vehicle heater 4. Thus, motor vehicle engine 2 is preheated, so that it can be started up under favorable starting conditions and put into operation.

When this first predetermined temperature is reached and/or exceeded, then control valve 11 opens bypass line 10 completely, so that a large amount of coolant, for example 1000 l/h goes through bypass 10 and fuel operated heating device 7, while the amount of coolant circulating in the remaining coolant circuit decreases to a small amount of less than 100 l/h, for example. Thanks to the large amount of coolant flowing through bypass line 10 and fuel operated heating device 7, the heating device 7 can be operated in a stable manner and without difficulties in terms of heat buildup and the like. Furthermore, the coolant is heated rapidly by the fuel operated heating device 7.

If the coolant going through bypass line 10 and fuel operated heating device 7 is heated to a temperature of about 70° C., i.e., a second predetermined temperature, bypass line 10 is gradually closed with the aid of control valve 11, in dependence on the increase in temperature of the coolant, so that a temperature of about 70° C. to about 80° C. is maintained at the outlet of fuel operated heating device 7. Thus, increasingly, a larger amount of coolant is fed through the entire motor vehicle coolant circuit.

The coolant that has been heated, once closing of the bypass line has commenced, first goes through the motor vehicle heater 4. In this way, the vehicle heater 4 can be operated even with a large drop in temperature in its heat exchanger 5 when heating blower 6 is turned on, thereby rapidly enabling heat to be delivered to the passenger compartment, for example, for defrosting the windshield.

The process for operating the motor vehicle heating system is accomplished so that bypass line 10 is, again, completely closed by the control valve 11, if a coolant temperature of about 80° C. is exceeded. When this temperature is reached, the fuel operated heating device 7 can be controlled in the usual manner, depending on the heat requirements of the motor vehicle heating system and the heat output of heating device 7.

Figure 2:
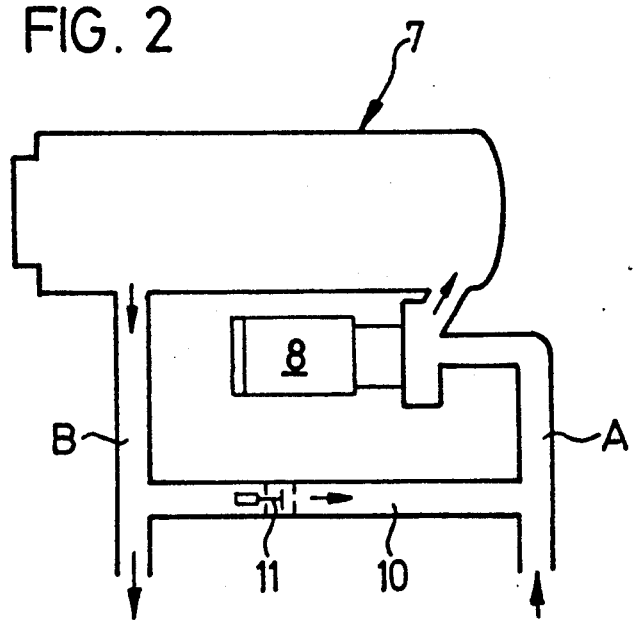
FIG. 2 is a schematic view of a detail of the motor vehicle heating system shown in FIG. 1 pertaining to the fuel operated auxiliary heating device.

With reference to FIG. 2, in which the same or similar parts as in FIG. 1 are provided with the same reference number, there is represented on an enlarged scale the section between line section A and line section B of the coolant circuit and fuel operated heating device 7 placed there. Advantageously, the temperature-controlled bypass line 10 is directly installed in the fuel operated heating device 7, so that heating device 7, which has integrated circulating pump 8, has one intake and one outlet for the coolant of the motor vehicle coolant circuit, and thus, can be directly installed in the motor vehicle coolant circuit shown in FIG. 1 in a so-called in-line installation type of construction.

Figure 4:
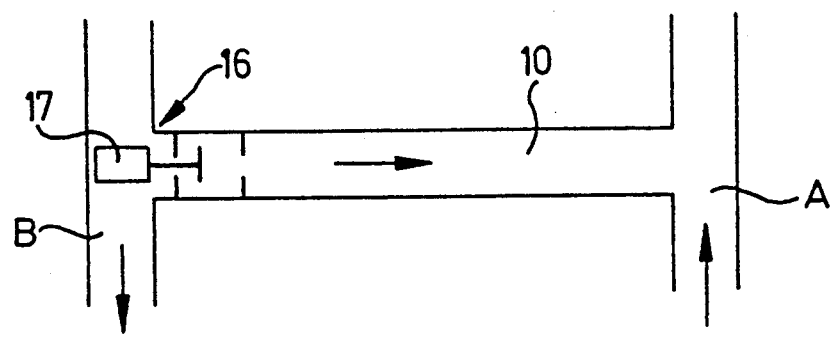
Figure 5:
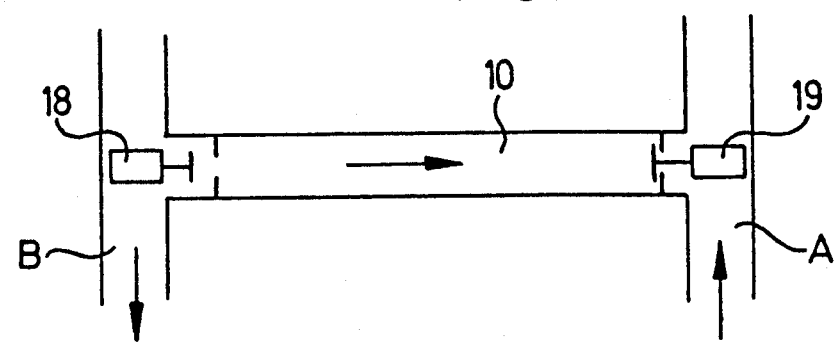

FIGS. 3 to 5 show modified embodiments of the valve arrangement by which the temperature dependent opening and closing of bypass line 10 is achieved in the motor vehicle heating system 1, according to the present invention, which is shown FIG. 1.

In FIG. 3, a solenoid valve 13 is placed in the bypass line 10 between coolant line sections A and B. The solenoid valve 13 is controlled by a control device 14 of the fuel operated heating device 7. The outlet of a temperature sensor 15, which is usually placed in the heating device, for example, on its outlet side, is connected with this control device 14. Control device 14, then, controls solenoid valve 13 on the basis of the temperature detected by temperature sensor 15, so that the above-described process can be carried out to operate motor vehicle heating system 1. That is, with the aid of solenoid valve 13, the bypass line 10 is opened and closed by the process according to the invention.

In FIG. 4, another embodiment of a valve arrangement for controlling the opening and closing of bypass line 10 is shown. In this case, a double-action valve 16 is placed in bypass 10, whose opening and closing movement is controlled by an element made of thermally extensible material 17, so that the above-described process for operating motor vehicle heating system 1 can be obtained.

In particular, initially the closure element of valve 16 blocks a first flow opening into bypass line 10, but as the first predetermined temperature is reached and exceeded, by coordination of its coefficient of thermal expansion, extensible element 17 will extend the closure element away from the first flow opening of the bypass line 10 (for example, to a position as shown in FIG. 4). Extensible element 17 will continue to shift the valve closure element as it is heated by the rising temperature of the heated coolant until, at the second predetermined temperature, it will, once again, cause the bypass line to be blocked; in this case, by closure element blocking a second flow opening.

In FIG. 5, finally, there is shown an embodiment in which a temperature responsive valve element is provided on both ends of the bypass line 10, i.e., at the end adjacent line section B and the end that is adjacent line section A. For example, elements of extensible material 18, 19 each control the position of a respective valve closure element to control the opening and closing of bypass line 10 in accordance with the process of the invention.

Thus, initially, bypass line 10 is closed by the action of element 19, as shown. However, once the coolant reaches or exceeds the first predetermined temperature, element 19 expands sufficiently to extend the associated valve closure element away from the respective flow opening of the bypass line. Flow then continues through the bypass line 10 until the second predetermined temperature is reached, at which point the coolant temperature will have caused the element 18 to expand sufficiently to bring its valve closure element into a position blocking the second flow opening.

In both of the embodiments shown in FIGS. 4 and 5, bypass 10 may be opened and closed independently of the temperature control device of the fuel operated heating device 7 in the manner intended according the invention.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Process for operating a motor vehicle heating system in a motor vehicle coolant circuit which contains a motor vehicle engine, a motor vehicle heater with a heat exchanger and an associated blower, and a fuel operated heating device that is operable independent of the vehicle engine and is connected upstream of the motor vehicle heater, comprising the steps of:

(A) circulating coolant through the complete motor vehicle coolant circuit until a first predetermined temperature of up to about 30° C. is reached;

(B) on reaching or exceeding of the first predetermined temperature, causing the coolant to bypass the motor vehicle engine and the motor vehicle heater and circulate between the intake and outlet of the fuel operated heating device, until a second predetermined temperature of up to about 70° to 80° C. is reached; and (C) upon reaching the second predetermined temperature, gradually increasing the circulation of coolant through the complete motor vehicle coolant circuit.

2. Process according to claim 1, wherein after achieving complete flow through the motor vehicle coolant circuit the performance of step (C), controlling the fuel operated heating device on the basis of at least one of the parameters of heating requirements and performance of the fuel operated heating device.

3. Motor vehicle heating system in a coolant circuit which contains a motor vehicle engine, a motor vehicle heater with a heat exchanger and a blower associated with it, and a fuel operated heating device that is operable independent of the engine and is connected upstream from the motor vehicle heater; wherein an intake and an outlet of the fuel operated heating device are connected by a bypass line, and wherein the bypass line is provided with valve means for controlling flow through the bypass line as a function of coolant temperature and valve control means causing the bypass line to be completely closed until a first predetermined coolant temperature of up to about 30° C. is reached, causing the bypass line to open on reaching or exceeding the first predetermined temperature and to remain open until a second predetermined temperature of about 70° C. to 80° C. is reached, and then causing the bypass line to gradually close until a completely closed position is reached.

4. Motor vehicle heating system according to claim 3, wherein the bypass line is incorporated within the fuel operated heating device.

5. Motor vehicle heating system according to claim 4, wherein said valve means comprises a temperature responsive solenoid valve placed in the bypass, said solenoid valve being connected to a control device of the fuel operated heating device having a temperature sensor.

6. Motor vehicle heating system according to claim 4, wherein said valve means comprises at least one valve which has an element of temperature-dependent extensible material for controlling opening thereof.

7. Motor vehicle heating system according to claim 6, wherein one said valve is provided in proximity to each end of the bypass line leading, respectively, to the intake and outlet of the fuel operated heating device for controlling the flow through the bypass line, one of which controls opening of the bypass line at said first predetermined temperature and the other of which controls closing of the bypass line at said second predetermined temperature.

8. Motor vehicle heating system according to claim 6, wherein said valve means is a single, double-action valve having a closure element which opens a first flow opening at said first predetermined temperature and closes a second flow opening at said second predetermined temperature under the action of said element of temperature dependent extensible material.

9. Motor vehicle heating system according to claim 3, wherein said valve means comprises a temperature responsive solenoid valve placed in the bypass, said solenoid valve being connected to a control device of the fuel operated heating device having a temperature sensor.

10. Motor vehicle heating system according to claim 3, wherein said valve means comprises at least one valve which has an element of temperature-dependent extensible material for controlling opening thereof.

11. Motor vehicle heating system according to claim 10, wherein one said valve is provided in proximity to each end of the bypass line leading, respectively, to the intake and outlet of the fuel operated heating device for controlling the flow through the bypass line, one of which controls opening of the bypass line at said first predetermined temperature and the other of which controls closing of the bypass line at said second predetermined temperature.

12. Motor vehicle heating system according to claim 10, wherein said valve means is a single, double-action valve having a closure element which opens a first flow opening at said first predetermined temperature and closes a second flow opening at said second predetermined temperature under the action of said element of temperature-dependent extensible material.

* * * * *